(12) United States Patent
Fotinos et al.

(10) Patent No.: US 11,493,276 B2
(45) Date of Patent: Nov. 8, 2022

(54) FEED WATER SUPPLEMENTARY THERMAL EXCHANGE APPARATUS, SYSTEM AND METHOD

(71) Applicant: NOVENTA ENERGY PARTNERS, Toronto (CA)

(72) Inventors: Dennis Fotinos, Toronto (CA); Stephen Condie, Toronto (CA)

(73) Assignee: Noventa Energy Partners Inc., Toronto (CA)

( * ) Notice: Subject to any disclaimer, the term of this patent is extended or adjusted under 35 U.S.C. 154(b) by 431 days.

(21) Appl. No.: 16/397,668

(22) Filed: Apr. 29, 2019

(65) Prior Publication Data

US 2020/0340663 A1 Oct. 29, 2020

(51) Int. Cl.
*F24F 13/10* (2006.01)
*F27D 17/00* (2006.01)
(Continued)

(52) U.S. Cl.
CPC ............ *F27D 17/004* (2013.01); *F22D 11/02* (2013.01); *F24D 17/02* (2013.01);
(Continued)

(58) Field of Classification Search
CPC ...... E03C 2001/005; F22D 11/02; F24D 3/18; F24D 11/025; F24D 17/02; F24D 15/04;
(Continued)

(56) References Cited

U.S. PATENT DOCUMENTS 4,602,672 A * 7/1986 Kaufmann ............ F24D 17/001
165/47
6,041,613 A * 3/2000 Morse ...................... F25B 13/00
62/238.7
(Continued)

FOREIGN PATENT DOCUMENTS

DE 202012102071 U1 * 11/2012 .............. F25B 30/06
DE 202012102071 U1 * 1/2013 ............ F24D 11/025
(Continued)

OTHER PUBLICATIONS

"The Professor: Don't Forget About Water as a Refrigerant," Aug. 8, 2016, John Tomczyk. Retrieved from Internet: <https://www.achrnews.com/articles/133119-the-professor-dont-forget-about-water-as-a-refrigerant>. (Year: 2016).*
(Continued)

*Primary Examiner* — Edelmira Bosques
*Assistant Examiner* — Brett Peterson Mallon
(74) *Attorney, Agent, or Firm* — Harter Secrest & Emery LLP; Michael Nicholas Vranjes

(57) ABSTRACT

A heat exchange system for transferring heat energy to control the temperature of a building comprising: a first heat exchanger having a first and second inlet and a first and second outlet wherein waste water flows through said first inlet of said first heat exchanger and out said first outlet while a water supply flows through said second inlet through said first heat exchanger and out said second outlet so as to transfer heat energy between said waste water and said water supply; and a second heat exchanger having a first and
(Continued)

second inlet and a first and second outlet wherein domestic water flows through said first inlet, through said second heat exchanger and out said first outlet while said water supply from said second outlet of said first heat exchanger flows through said second inlet, through said second heat exchanger and out said second outlet so as to further transfer heat energy between said domestic water and said water supply from said second outlet of said second heat exchanger and control the temperature of said building.

12 Claims, 3 Drawing Sheets

(51) Int. Cl.
*F22D 11/02* (2006.01)
*F24D 17/02* (2006.01)
*E03C 1/00* (2006.01)
*F28D 21/00* (2006.01)

(52) U.S. Cl.
CPC .... *F28D 21/0012* (2013.01); *E03C 2001/005* (2013.01); *F24D 2200/20* (2013.01); *Y02B 30/12* (2013.01); *Y02B 30/18* (2013.01)

(58) Field of Classification Search
CPC ............. F24D 17/0005; F24D 19/1054; F24D 2200/12; F24D 2200/20; F24D 2220/042; F25B 13/00; F25B 2313/003; F25B 2313/004; F27D 17/004; F28D 21/0012; Y02B 30/12; Y02B 30/18; Y02B 30/52
See application file for complete search history.

(56) References Cited

U.S. PATENT DOCUMENTS

| | | | |
|---|---|---|---|
| 6,131,647 A * | 10/2000 | Suzuki | F28D 15/0266 165/104.33 |
| 7,160,443 B2 | 1/2007 | Frommann | |
| 8,499,471 B2 | 8/2013 | Coronella et al. | |
| 8,603,336 B2 | 12/2013 | Frommann | |
| 9,719,704 B2 | 8/2017 | Giraldo et al. | |
| 10,345,004 B1 * | 7/2019 | Hern | F24D 15/04 |
| 2009/0145149 A1 * | 6/2009 | Sato | F24D 3/18 62/238.4 |
| 2011/0203303 A1 * | 8/2011 | Moure | F28D 7/0058 62/324.1 |
| 2012/0151950 A1 * | 6/2012 | Jagusztyn | F28F 1/003 165/104.11 |
| 2012/0159980 A1 * | 6/2012 | Moure | F24H 9/0015 165/104.13 |
| 2012/0318491 A1 * | 12/2012 | Melink | F24D 19/1015 165/200 |
| 2014/0123689 A1 * | 5/2014 | Ellis | F24D 15/04 62/238.7 |
| 2015/0047579 A1 | 2/2015 | Thomson | |
| 2018/0128506 A1 * | 5/2018 | Taras | F25B 30/02 |
| 2018/0328633 A1 | 11/2018 | Jacobi | |

FOREIGN PATENT DOCUMENTS

| | | | | |
|---|---|---|---|---|
| EP | 2458304 A2 * | 5/2012 | | F24D 11/0221 |
| EP | 1970660 | 11/2016 | | |
| FR | 3043758 A1 * | 5/2017 | | F24D 3/18 |
| JP | 4492634 B2 * | 6/2010 | | |
| KR | 101325897 B1 * | 11/2013 | | |
| KR | 20150114219 A * | 10/2015 | | |
| WO | WO-2020220107 A1 * | 11/2020 | | F22D 1/50 |

OTHER PUBLICATIONS

Tomczyk, John. The Professor: Don't Forget About Water as a Refrigerant. ACHR News. Aug. 6, 2016. (https://www.achrnews.com/articles/133119-the-professor-dont-forget-about-water-as-a-refrigerant) (Year: 2016).*
Screen capture from YouTube video clip entitled "Huber Wastewater Heat Exchanger RoWin—Animation ," 1 page, uploaded on Oct. 14, 2016 by user "Huber SE". Retrieved from Internet: <https://www.youtube.com/watch?v=l1GkizDtOOM> (check at 25 and 52 seconds). (Year: 2016).*
English translation of KR-101325897-B1, dated Jul. 15, 2022 (Year: 2022).*
English translation of JP-4492634-B2, dated Jul. 15, 2022 (Year: 2022).*

* cited by examiner

FEED WATER SUPPLEMENTARY THERMAL EXCHANGE APPARATUS, SYSTEM AND METHOD

FIELD OF THE INVENTION

The invention relates to feed water supplementary thermal exchange apparatus, systems and methods and in particular relates to a domestic feed water supplementary cooling apparatus, system and method.

BACKGROUND OF THE INVENTION

Heat exchangers are commonly used devices for transferring thermal energy from one medium to another. For example a. heat exchanger is a device used to transfer heat between two or more fluids. In other words, heat exchangers are used in both cooling and heating processes. The fluids may be separated by a solid wall to prevent mixing or they may be in direct contact In todays' world there is a desire to operate in a green eco-friendly energy environment as well as improving the thermal efficiency and thermal recovery of waste energy.

For example EP1970660 relates to an arrangement for reclaiming heat energy from wastewater and associated with a sewer line, having an intermediate storage connected to the sewer line by means of at least one inlet and having a heat exchanger associated with the intermediate storage, the arrangement further comprising a pump device associated with the intermediate storage for transporting wastewater into the heat exchanger, and the arrangement comprising a discharge connected to the sewer line and through which the wastewater can flow back into the sewer line after passing through the heat exchanger, the inlet comprising a filter device having a cleaning device, the cleaning device comprising a conveyor screw.

Furthermore U.S. Pat. No. 7,160,443 relates to apparatus for removing material from a liquid flowing through a channel including a sieve grate, a screw conveyor and a detaching device. The sieve grate has an inflow side, an inner side and an outer side. The sieve grate is designed to be cylindrical and to be rotatably driven. The sieve grate is arranged at an inclined orientation to be partially submerged in the liquid. The sieve grate at the inflow side includes an open face. The sieve grate at the inner side includes a plurality of guide plates. The sieve grate includes a shaping carrier element. The sieve grate includes a mesh fabric, the mesh fabric being designed and arranged to form a separation surface for the material. The screw conveyor includes a housing. The screw conveyor includes a driven conveying screw. The screw conveyor is coaxially arranged with respect to the sieve grate. The screw conveyor in the region of the sieve grate includes a feeding hopper for the material, the feeding hopper having a bottom side and including a majority of openings located in the region of the bottom side. The detaching device is arranged at the outer side of the sieve grate and above the feeding hopper in a stationary way. The detaching device is designed and arranged to detach material which adheres to the separation surface from inside of the sieve grate.

The apparatus, system and method shown in EP1970660 and U.S. Pat. No. 7,160,443 are known in the industry as Huber (trademark) Solution or System from sewers or waste water where a heat exchange system is provided for heating or cooling with waste water from for example a sewer. The Huber System recovers heat energy from a sewer in their Thermwin (trademark) system, and or Rowin (trademark) System.

In addition an auger or conveyor screw can be used in the Huber System. Other prior art arrangements and methods are shown in the following prior art U.S. Pat. No. 8,499,471 relates to a drying apparatus configured to dry a feed material, the feed material having a first density, the drying apparatus comprising: a feed material inlet; the feed material inlet configured to supply a feed material to be dried to the drying apparatus and produce dried feed material; a bed coupled to the feed material inlet and having a dried feed material outlet, the bed comprising fluidized bed media, the fluidized bed media comprising a different material from the feed material and having a second density, the second density being different than the first density; a heat source coupled to the bed; and a fluid source coupled to the bed, the fluid source configured to supply a fluid to agitate the fluidized bed material and the feed; wherein the fluidized bed media dries the feed material and density differences between the first density and the second density cause the dried feed material to be selectively removed from the bed through the dried feed material outlet.

U.S. Pat. No. 8,603,336 shows a method for transferring heat includes flowing a wastewater through a tank and flowing a fluid through a heat exchanger having an outer surface. The method further includes aerating the wastewater to produce a convective flow, contacting the outer surface of the heat exchanger with the convective flow to exchange heat, and cleaning the outer surface of the heat exchanger with the convective flow. A system for transferring heat includes a tank, a heat exchanger with an outer surface disposed in the tank, and a fluid flowing through the heat exchanger. Wastewater located in the tank flows over the outer surface of the heat exchanger, and a diffusion pipe disposed in the tank provides air into the tank to produce a convective flow in the wastewater Yet another arrangement is shown in U.S. Pat. No. 9,719,704 which teaches integrated systems and methods for onsite wastewater treatment in which a portion of onsite energy demands may be driven by energy harvested from the wastewater. Thermal energy of wastewater may be transferred from an onsite wastewater treatment system to an onsite heat pump to recover thermal energy, at least a portion of which may then be delivered to an onsite energy demand.

Moreover US20150047579 relates to a heat recovery system arranged to heat water includes at least one heat exchanger (9) arranged to heat water by heat exchange with waste heat. A storage reservoir (11) is arranged to store water heated by the heat exchanger (9). The heat exchanger (9) is switchable between a first mode of operation in which water is circulated by a pump (12) in a circuit that includes the storage reservoir (11) and the heat exchanger (9), and a second mode of operation in which water is circulated by the pump (12) in a circuit that by-passes the heat exchanger (9). Heated water of at least a desired minimum temperature can be supplied to at least one outlet during both the first and second modes of operation.

Finally US20180328633 shows a supplemental heat transfer apparatus for a structure comprising: a pressure sewer system associated with said structure and having a wastewater conduit for removal of wastewater from said structure; and a geothermal system, constructed and arranged in cooperation with said structure, having at least one geothermal loop for circulating a heat transfer fluid, said wastewater conduit and said geothermal loop being arranged in proximity to each other to effect heat transfer between said wastewater conduit and said geothermal loop.

It is an object of this invention to provide apparatus, systems and methods that are an improvement over the prior art and in particular to provide improvements to the thermal efficiency and thermal recovery of waste energy, including the Huber System.

It is another object of this invention to provide improved domestic feed water supplementary cooling system.

SUMMARY OF INVENTION

It is an aspect of this invention to provide apparatus for transferring heat energy comprising: a first heat exchanger for transferring thermal energy between waste water fluid and a first fluid; and a second heat exchanger connected to the first heat exchanger for transferring heat energy between the first fluid and a domestic water supply.

It is another aspect of this invention to provide a heat exchange system for transferring heat energy to control the temperature of a building comprising: a first heat exchanger having a first and second inlet and a first and second outlet wherein waste water flows through said first inlet of said first heat exchanger and out said first outlet while a water supply flows through said second inlet through said first heat exchanger and out said second outlet so as to transfer heat energy between said waste water and said water supply; and a second heat exchanger having a first and second inlet and a first and second outlet wherein domestic water flows through said first inlet, through said second heat exchanger and out said first outlet while said water supply from said second outlet of said first heat exchanger flows through said second inlet, through said second heat exchanger and out said second outlet so as to further transfer heat energy between said domestic water and said water supply from said second outlet of said second heat exchanger and control the temperature of said building.

In one embodiment the heat exchange system further includes valves and pumps for selectively delivering at least a first circuit for cooling the temperature of said building wherein the temperature of said waste water is cooler than said water supply for cooling said water supply through said first heat exchanger, and for further cooling said water supply through said second heat exchanger so as to cool said building. In another embodiment the valves and pumps selectively deliver at least a second circuit for heating the temperature of said building wherein the temperature of said waste water is warmer than said water supply for heating said water supply through said first heat exchanger and said second heat exchanger is bypassed so as to heat said building.

In yet another embodiment of the invention the first heat exchanger comprises a Huber Rowin heat exchanger. Another embodiment of the invention the second heat exchanger comprises a plate frame heat exchanger.

A further embodiment relates to a heat exchange system wherein said building is selected from the group of hospital buildings, multi-unit residential buildings, office buildings and industrial facilities.

Another aspect of this invention relates to a method of controlling the temperature of a building comprising the steps of: introducing waste water from a sewer into a first heat exchanger, introducing a water supply into the first heat exchanger so as to transfer heat energy between said water supply and waste water so as to: i) produce thermally treated water supply, and ii) produce thermally treated waste water returned to the sewer; then introducing the thermally treated water supply into a second heat exchanger; introducing domestic water into the second heat exchanger so as to transfer thermal energy between said thermally treated water supply and said domestic water so as to: i) produced a supplemented thermally treated water supply, and ii) produce thermally treated domestic water; introducing said thermally treated domestic water to said building; and selectively returning said supplemented thermally treated water supply to a heat pump or said second heat exchanger.

A further aspect of this invention relates to a method of controlling the temperature of a building wherein the first heat exchanger has a first and second inlet and a first and second outlet and said second heat exchanger has a first and second inlet and a first and second outlet, and: wherein said waste water is introduced at said first inlet of said first heat exchanger at a first waste water temperature and exits said first outlet of said first heat exchanger as said thermally treated waste water at a second waste water temperature; and said water supply is introduced at said second inlet of said first heat exchanger at a second inlet water supply temperature and exits said second outlet of said first heat exchanger as said thermally treated water supply at a second temperature; and wherein said domestic water is introduced at said first inlet of said second heat exchanger at a first domestic water temperature and exists said first outlet of said second heat exchanger at a second domestic water temperature; and said thermally treated water supply at said second temperature is introduced at said second inlet of said second heat exchanger and exits said second heat exchanger at said supplemented thermally treated water supply at supplemented temperature.

In one embodiment the method of controlling the temperature of a building includes the step of selectively diverting a portion of said domestic water at said first domestic water temperature between said first inlet of said second heat and said building.

In another embodiment of the invention the method of controlling the temperature of a building includes sensing the temperature of said domestic water temperature at said second domestic water temperature to control the temperature at a selected level by activating a diverter valve to divert a portion of said domestic water at said first domestic water temperature between said first inlet of said second heat exchanger and said building.

In a further embodiment of this invention a method of controlling the temperature of a building includes the step of cooling the said building by selectively activating valve means and pump means to deliver a first circuit wherein: the waste water at said first waste water temperature is lower than said second waste water temperature; the water supply at said second inlet temperature is higher than said thermally treated water supply at said second temperature; said domestic water at said first domestic water temperature is lower than said second domestic water temperature; and said thermally treated water supply at said second temperature is higher than said supplemented thermally treated water supply.

In yet another embodiment of the invention a method of controlling the temperature of a building includes a heat pump that heats the water supply to said second inlet temperature.

Another aspect of this invention relates to a method of controlling the temperature of a building including the step of heating the said building by selectively activating valve means and pump means to deliver a second circuit wherein: the temperature of said waste water is warmer than said water supply for heating said water supply through said first heat exchanger and said second heat exchanger is bypassed so as to heat said building.

These and other objects and features of the invention shall now be described in relation to the following drawings.

IN THE DRAWINGS

DETAILED DESCRIPTION OF THE INVENTION

Like parts are given like numbers throughout the figures.

Figure 1:
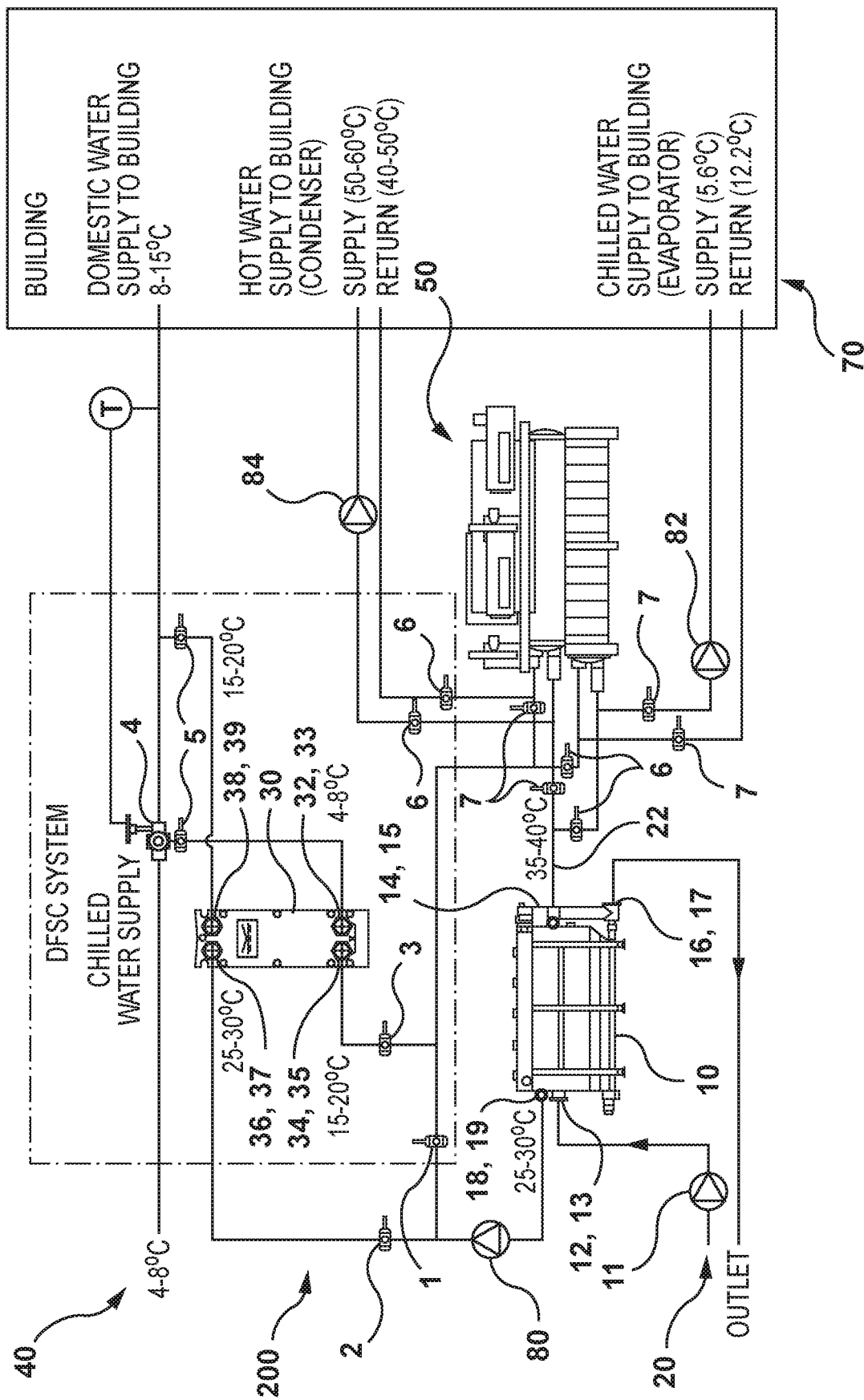
FIG. 1 is a schematic drawing of one embodiment of the domestic feed water supplementary cooling system (DFSC) showing the first and second heat exchangers

FIG. 1 generally illustrates a schematic drawing of the apparatus, system and method of this invention generally shown as 200. In particular the invention includes a first heat exchanger means 10, a second heat exchanger means 30, a heat pump 50 and a building 70.

Waste water 20 is pumped through the first heat exchanger 10 at the same time as a first fluid 22 is introduced through the first heat exchanger 10 to transfer thermal energy between the waste water 20 and the first fluid or water supply 22. Generally speaking the waste water 20 is used to reduce the temperature of the first fluid or water supply 22 as it passes through the first heat exchanger 10.

In one embodiment the first heat exchanger 10 can comprise a Huber Rowin (trademark) heat exchanger, although the invention comprises other types of first heat exchangers. A Huber Rowin heat exchanger can comprise an arrangement for reclaiming heat energy from wastewater associated with a sewer line, having an intermediate storage (not shown) connected to the sewer line (not shown) by means of at least one inlet 12 and having a heat exchanger 10 associated with the intermediate storage (not shown), the arrangement further comprising a pump device 11 associated with the intermediate storage (not shown) for transporting wastewater 20 into the heat exchanger 10, and the arrangement comprising a discharge 16 connected to the sewer line (not shown) and through which the wastewater 20 can flow back into the sewer line (not shown) after passing through the heat exchanger 10. The Huber Rowin (trademark) heat exchanger can have the inlet 12 comprising a filter device (not shown) having a cleaning device, characterized in that the cleaning device (not shown) comprises a conveyor screw (not shown) but described and illustrated in EP1970660B1.

The first heat exchanger 10 has a first inlet 12, a second inlet 14, a first outlet 16 and a second outlet 18. Waste water 20 is pumped through pump 11 to first heat exchanger 10 through first heat exchanger inlet 12 through the first heat exchanger 10 and out the first heat exchanger outlet 16. The waste water at the first heat exchanger first inlet 12 is at a first waste water temperature 13, and exits the first heat exchanger first outlet 16 at a second waste water temperature 17.

In one embodiment the waste water 20 at the first heat exchanger inlet 12 is at a first waste water inlet temperature 13 that is lower that the waste water temperature at the first heat exchanger outlet temperature 17.

Generally speaking the heat pump shown in FIG. 1 is connected to a building. The heat pump has a first circuit where chilled water is supplied to a building 70 through the evaporator side so as to extract heat from the building. In one example the heat pump supplies chilled water at for example 5.6 degrees centigrade and is returned at 12.2 degrees centigrade. This is by way of example only, where the heat pump is used in a cooling circuit to be described herein. The heat pump also has a second circuit where hot water is supplied to a building 70 through the condenser loop where for example hot water is supplied to the building at 50-60 degrees centigrade and returned 40-50 degrees centigrade. This is by way of example only where the heat pump is used in a heating circuit to be described herein A heat pump 50 can be used for drawing heat energy from a building 70. In one embodiment the heat pump 50 is connected to the building 70 through the evaporator loop as previously described so as to deliver a first fluid 22 at a first fluid inlet 14 temperature 15. Once the first fluid or water supply passes through the second inlet 14 of the first heat exchanger 10 it exits the first heat exchanger 10 at the second outlet 18 at a thermally treated first water supply (or first fluid) temperature 19.

In one embodiment the water supply or first fluid 22 at the first heat exchanger second inlet 14 is at a first water supply temperature 15 that is higher that the thermally treated first water supply (or first fluid) at the first heat exchanger 10 second outlet 18 temperature 19.

The apparatus, system and method of this invention includes a second heat exchanger means 30 having a first inlet 32, a first outlet 38 and a second inlet 36 and a second outlet 34.

A domestic water supply 40 is introduced at the first inlet 32 of the second heat exchanger means 30 at a first domestic water temperature 33, through the second heat exchanger means 30 and exits the first outlet 38 of the second heat exchanger means 30 at a second domestic water temperature 39. At the same time in one embodiment the thermally treated water supply 18 at the thermally treated water supply temperature 19 is introduced at the second inlet 36 at temperature 37 and exits the second heat exchanger 30 at the second outlet 34 as a supplemented thermally treated water supply at a supplemented thermally treated temperature 35.

Generally speaking the thermally treated first water supply (or first fluid) temperature 19 is the same as temperature 37 or close thereto as there could be some slight temperature change due to the length of travel between outlet 18 and inlet 36.

The second heat exchanger 30 in one embodiment comprises a plate frame heat exchanger, although the invention comprises other typical heat exchangers as described herein having domestic feed water supplementary cooling systems. Generally speaking the supplemented thermally treated water supply at the second outlet of the second heat exchanger is at supplemented thermally treated temperature 35. In one embodiment the supplemented thermally treated temperature 35 is lower than the thermally treated water supply temperature 19 that is introduced at the second inlet 36 at temperature 37. In other words it is cooled.

The apparatus and system includes the fluid conduits shown as well as the valves 1, 2,3,4,5,6,7 shown. The apparatus and system also includes the pumps 11, 80, 82 and 84.

Figure 2:
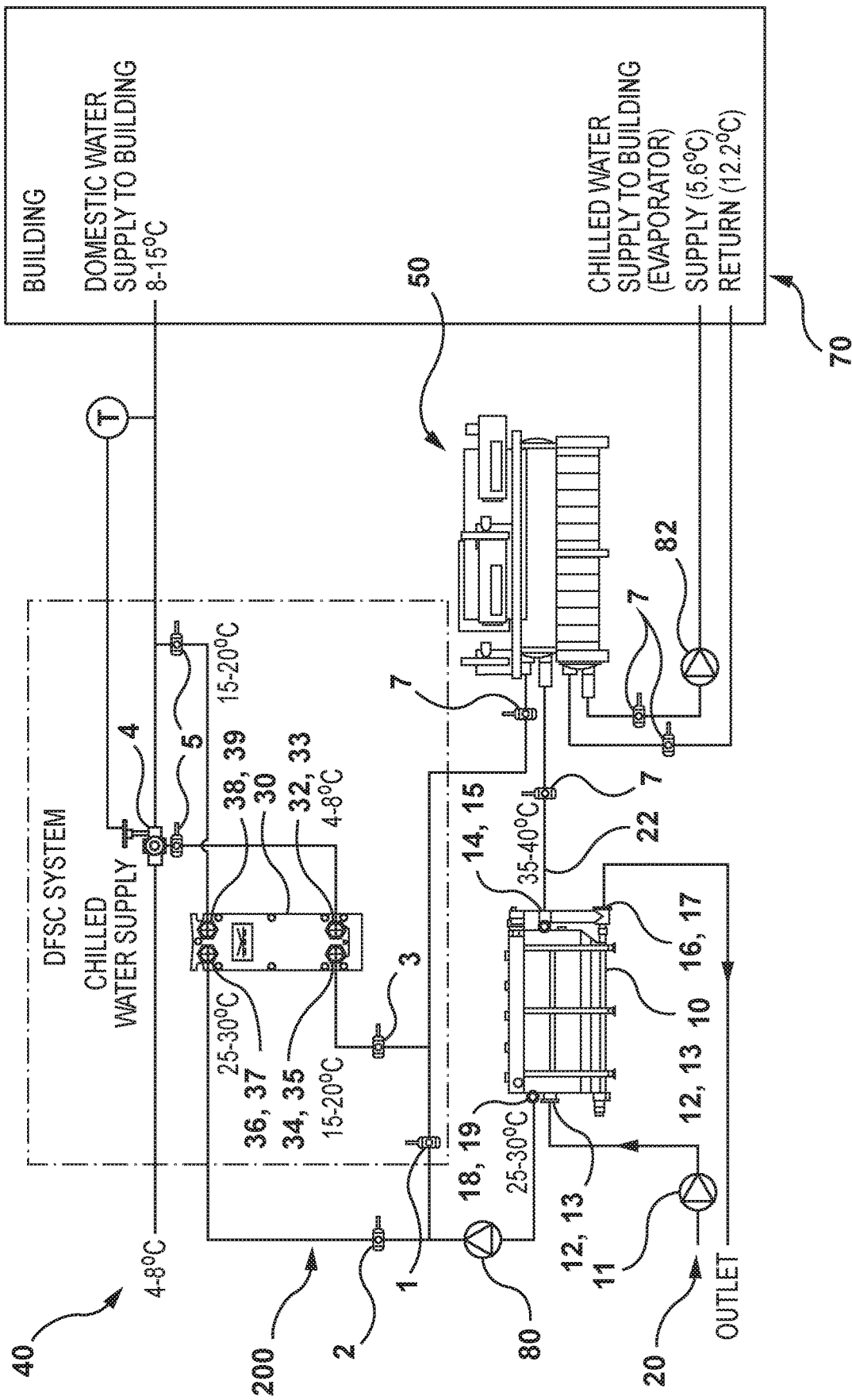
FIG. 2 is another schematic drawing of one embodiment of the domestic feed water supplementary cooling system showing the first and second heat exchangers in a cooling circuit.

FIG. 2 generally describes the system and method of FIG. 1 in a cooling mode where the system and method are operated in a first circuit. The apparatus and system comprise of the components as shown in FIG. 1 where valves 7 are open and valves 2,3, and 5 are normally open and valve 1 is normally closed. Valve 4 (for example a 3 way diverter valve) is operated based on the suitable domestic supply temperature to the building. In particular the embodiment shown in FIG. 2 includes a temperature sensor T connected to the valve 4. The temperature sensor T may be selected to control the temperature of the blended domestic water supply that is actually supplied to the building. For example cold water being supplied to the building should generally not be above 15 degrees centigrade as bacteria and other pathogens develop at warmer temperatures. Furthermore many people do not enjoy drinking water above 15 degrees centigrade. Accordingly if temperature sensor T senses an elevated temperature of the blended temperature approaching a selected level such as 15 degrees centigrade the valve 4 diverts a portion of the domestic water from the city to blend with the supplemental thermally treated water supply 38 at temperature 39 so as to reduce the temperature of the domestic water supply 40.

The diverter valve 4 can divert anywhere from greater than zero to 100 percent of the domestic water 40 to second heat exchanger 30.

FIG. 2 illustrates a method of controlling or cooling the temperature of a building 70 by selectively activating valves 2,3,5 and 7 in an open position (normally open position NO) valve 1 is in a closed (normally closed position NC) and valve 4 is operated based on a suitable domestic supply temperature to the building 70 as described above through temperature sensor T, so that the pumps 11, 80, and 82 with the valves are activated to define a first circuit (or cooling circuit to the building 70) wherein:
 (i) the waste water 20 at said first waste water temperature 13 is lower than said second waste water temperature 17;
 (ii) said water supply at said second inlet temperature 15 is higher than said thermally treated water supply at said second temperature 19;
 (iii) said domestic water at said first domestic water temperature 32 is lower than said second domestic water temperature 39;
 (iv) said thermally treated water supply at said second temperature 37 is higher than said supplemented thermally treated water supply temperature 35.

By way of example only:
temperature 13 can be in the range of 5-15 degrees centigrade;
temperature 17 can be in the range of 10-20 degrees centigrade;
temperature 15 can be in the range of 35-40 degrees centigrade;
temperature 19 can be in the range of 25-30 degrees centigrade;
temperature 37 can be in the range of 25-30 degrees centigrade;
temperature 39 can be in the range of 15-20 degrees centigrade;
temperature 33 can be in the range of 4-8 degrees centigrade;
temperature 35 can be in the range of 15-20 degrees centigrade
the domestic water from the city can be in the range of 4-8 degrees centigrade; the domestic water supply to the building can be 8-15 degrees centigrade.

In the cooling mode of FIG. 2 the valves 7 are open and the valves 6 (shown in FIG. 1 are closed. The temperature ranges described above are for illustration purposes only and the actual temperatures may change based on the domestic feed water supplementary cooling system sizing. Furthermore the domestic feed water supplementary cooling system is only in operation during the cooling mode.

Figure 3:
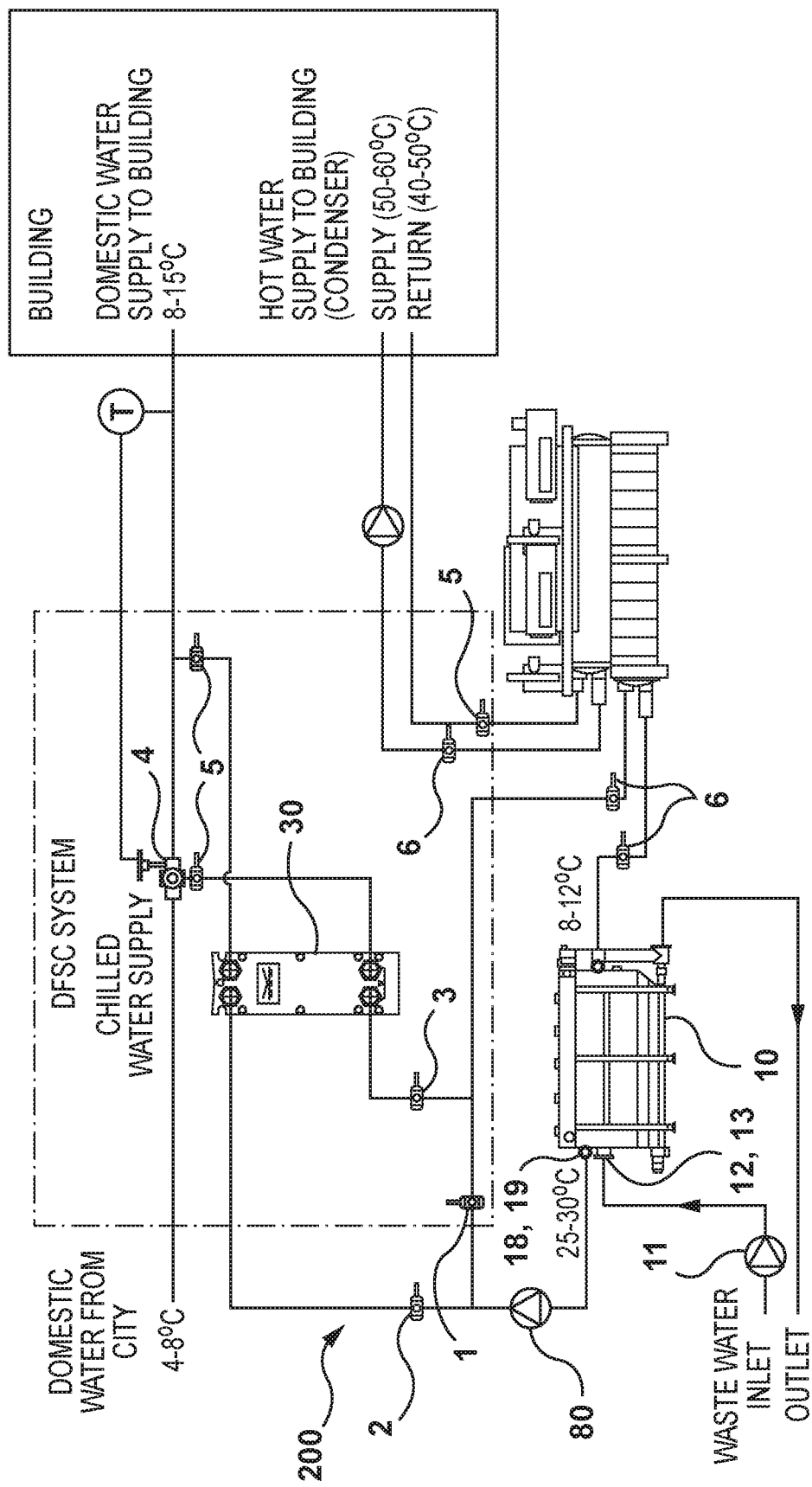
FIG. 3 is yet another schematic drawing of one embodiment of the domestic feed water supplementary cooling system showing the first and second heat exchangers where the second heat exchanger is in a bypass mode when heating or heating circuit.

In the heating mode illustrated in FIG. 3 the valves and pumps are selectively activated to deliver a second circuit wherein the temperature of the waste water is warmer than the water supply for heating the water supply through the first heat exchanger and the second heat exchanger 30 is bypassed so as to heat the building 70.

FIG. 3 generally illustrates the heating circuit where the domestic feed water supplementary cooling system is in by-pass operation and valve 1 is open valves 2,3 and 5 are closed and valve 4 is locked in by pass mode.

What is claimed:

1. A heat exchange system for transferring heat energy to control the temperature of a building, comprising:
    a first heat exchanger including a first and second inlet and a first and second outlet wherein waste water flows through said first inlet of said first heat exchanger and out said first outlet while a water supply flows through said second inlet through said first heat exchanger and out said second outlet so as to transfer heat energy between said waste water and said water supply;
    a second heat exchanger including a first and second inlet and a first and second outlet wherein domestic water flows through said first inlet, through said second heat exchanger and out said first outlet while said water supply from said second outlet of said first heat exchanger flows through said second inlet, through said second heat exchanger and out said second outlet so as to further transfer heat energy between said domestic water and said water supply from said second outlet of said second heat exchanger and control the temperature of said building;
    a diverter valve for diverting said domestic water to said second heat exchanger; and,
    a valve means and a pump means for selectively delivering a first circuit for cooling the temperature of said building, wherein the temperature of said waste water is cooler than said water supply for cooling said water supply through said first heat exchanger, and for further cooling said water supply through said second heat exchanger so as to cool said building.

2. The heat exchange system as recited in claim 1, wherein said valve means and said pump means selectively deliver at least a second circuit for heating the temperature of said building wherein the temperature of said waste water is warmer than said water supply for heating said water supply through said first heat exchanger and said second heat exchanger is bypassed so as to heat said building.

3. The heat exchange system as recited in claim 1, wherein said second heat exchanger comprises a plate frame heat exchanger.

4. The heat exchange system as recited in claim 1, further comprising a temperature sensor for controlling the temperature of said domestic water supplied to said building, wherein said diverter valve is operatively arranged to selectively divert the domestic water to the second heat exchanger.

5. The heat exchange system as recited in claim 1, wherein said building is selected from the group consisting of a hospital building, a multi-unit residential building, an office building, and an industrial facility.

6. A method of controlling the temperature of a building comprising the steps of:
  (a) introducing waste water from a sewer into a first heat exchanger;
  (b) introducing a water supply into the first heat exchanger so as to transfer heat energy between said water supply and waste water so as to:
    i) produce a thermally treated water supply; and,
    ii) produce thermally treated waste water returned to the sewer;
  (c) introducing the thermally treated water supply to a second heat exchanger;
  (d) diverting a portion of domestic water into the second heat exchanger so as to transfer thermal energy between said thermally treated water supply and said domestic water so as to:
    i) produce a supplemented thermally treated water supply; and,
    ii) produce thermally treated domestic water;
  (e) introducing said thermally treated domestic water to said building;
  (f) returning said supplemented thermally treated water supply to a heat pump and/or to said building; and,
  (g) heating said building by selectively activating a valve means and a pump means to deliver a first circuit, wherein the temperature of said waste water is warmer than said water supply for heating said water supply through said first heat exchanger, and said second heat exchanger is bypassed so as to heat said building.

7. The method as recited in claim 6, wherein:
  the first heat exchanger has a first and second inlet and a first and second outlet and said second heat exchanger has a first and second inlet and a first and second outlet;
  said waste water is introduced at said first inlet of said first heat exchanger at a first waste water temperature and exits said first outlet of said first heat exchanger as said thermally treated waste water at a second waste water temperature;
  said water supply is introduced at said second inlet of said first heat exchanger at a second inlet water supply temperature and exits said second outlet of said first heat exchanger as said thermally treated water supply at a second temperature;
  diverted domestic water is introduced at said first inlet of said second heat exchanger at a first domestic water temperature and exits said first outlet of said second heat exchanger at a second domestic water temperature; and,
  said thermally treated water supply at said second temperature is introduced at said second inlet of said second heat exchanger and exits said second heat exchanger at a supplemented thermally treated water supply at a supplemented thermally treated water supply temperature.

8. The method as recited in claim 6, further comprising selectively diverting a portion of said domestic water at said first domestic water temperature at a point between said first inlet of said second heat exchanger and said building.

9. The method as recited in claim 6, further comprising:
  determining, using a sensor, that a temperature of said domestic water being supplied to the building is outside a predetermined range; and,
  activating a diverter valve to divert a portion of said domestic water to said second heat exchanger.

10. The method as recited in claim 6, further comprising cooling said building by selectively activating a valve means and a pump means to deliver a second circuit, wherein:
  said waste water at said first waste water temperature is lower than said second waste water temperature;
  said water supply at said second inlet water supply temperature is higher than said thermally treated water supply at said second temperature;
  said domestic water at said first domestic water temperature is lower than said second domestic water temperature; and,
  said thermally treated water supply at said second temperature is higher than said supplemented thermally treated water supply.

11. The method as recited in claim 10, wherein a heat pump heats the water supply to said second inlet water supply temperature.

12. A heat exchange system for transferring heat energy to control the temperature of a building, comprising:
  a first heat exchanger including a first and second inlet and a first and second outlet wherein waste water flows through said first inlet of said first heat exchanger and out said first outlet while a water supply flows through said second inlet through said first heat exchanger and out said second outlet so as to transfer heat energy between said waste water and said water supply;
  a second heat exchanger including a first and second inlet and a first and second outlet wherein domestic water flows through said first inlet, through said second heat exchanger and out said first outlet while said water supply from said second outlet of said first heat exchanger flows through said second inlet, through said second heat exchanger and out said second outlet so as to further transfer heat energy between said domestic water and said water supply from said second outlet of said second heat exchanger and control the temperature of said building;
  a diverter valve for diverting said domestic water to said second heat exchanger; and,
  a valve means and a pump means for selectively delivering a circuit for heating the temperature of said building wherein the temperature of said waste water is warmer than said water supply for heating said water supply through said first heat exchanger and said second heat exchanger is bypassed so as to heat said building.

* * * * *